United States Patent
Kim et al.

(10) Patent No.: US 9,671,914 B2
(45) Date of Patent: Jun. 6, 2017

(54) DISPLAY DEVICE INCLUDING TOUCH SENSOR

(71) Applicant: Samsung Display Co., Ltd., Yongin (KR)

(72) Inventors: Byoung Sun Kim, Seoul (KR); Yang Wan Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/732,223

(22) Filed: Jun. 5, 2015

(65) Prior Publication Data
US 2016/0170524 A1    Jun. 16, 2016

(30) Foreign Application Priority Data
Dec. 12, 2014  (KR) .................. 10-2014-0179320

(51) Int. Cl.
*G06F 3/044*    (2006.01)

(52) U.S. Cl.
CPC .... *G06F 3/044* (2013.01); *G06F 2203/04102* (2013.01); *G06F 2203/04103* (2013.01); *G06F 2203/04112* (2013.01)

(58) Field of Classification Search
CPC ........... G06F 3/044; G06F 3/047; G06F 3/416
See application file for complete search history.

(56) References Cited

U.S. PATENT DOCUMENTS

| | | | | |
|---|---|---|---|---|
| 2011/0310037 A1* | 12/2011 | Moran | .................. | G06F 3/0412 345/173 |
| 2013/0028503 A1* | 1/2013 | Wakui | .................. | H05K 9/0086 382/141 |
| 2014/0152579 A1* | 6/2014 | Frey | .................. | G06F 3/044 345/173 |
| 2014/0152580 A1* | 6/2014 | Weaver | .................. | G06F 3/041 345/173 |
| 2014/0160373 A1* | 6/2014 | Hsu | .................. | G06F 3/044 349/12 |
| 2014/0333555 A1* | 11/2014 | Oh | .................. | G06F 3/044 345/173 |
| 2015/0041203 A1* | 2/2015 | Lebens | .................. | H05K 1/0296 174/261 |
| 2015/0123942 A1* | 5/2015 | Huang | .................. | G06F 3/044 345/174 |
| 2015/0157225 A1* | 6/2015 | Gillberg | .................. | A61B 5/04085 600/393 |
| 2016/0139708 A1* | 5/2016 | Tseng | .................. | G06F 3/044 345/174 |

FOREIGN PATENT DOCUMENTS

| | | |
|---|---|---|
| KR | 10-1279599 | 6/2013 |
| KR | 10-2013-0091518 | 8/2013 |
| KR | 10-2013-0118072 | 10/2013 |
| KR | 10-2013-0124882 | 11/2013 |
| KR | 10-2013-0128928 | 11/2013 |
| KR | 10-2014-0003050 | 1/2014 |
| KR | 10-2014-0016626 | 2/2014 |

* cited by examiner

*Primary Examiner* — Ricardo L Osorio
(74) *Attorney, Agent, or Firm* — H.C. Park & Associates, PLC

(57) ABSTRACT

A display device includes a substrate and a touch electrode layer disposed on the substrate. The touch electrode layer includes a touch electrode having a mesh pattern. The density of the mesh pattern in a central portion of the touch electrode is different from the density of the mesh pattern at an outer portion of the touch.

16 Claims, 10 Drawing Sheets

DISPLAY DEVICE INCLUDING TOUCH SENSOR

CROSS-REFERENCE TO RELATED APPLICATION

This application claims priority from and the benefit of Korean Patent Application No. 10-2014-0179320, filed on Dec. 12, 2014, which is hereby incorporated by reference for all purposes as if fully set forth herein.

BACKGROUND

Field

Exemplary embodiments relate to a display device including a touch sensor.

Discussion of the Background

A flat panel display (FPD) such as an organic light emitting diode display (OLED), a liquid crystal display (LCD), and an electrophoretic display (EPD) includes a display panel in which a field generating electrode and an electro-optical active layer are formed. For the electro-optical active layer, the OLED includes an organic emission layer, the LCD includes a liquid crystal layer, and the EPD includes charged particles. The field generating electrode is connected to a switching element, such as a thin film transistor, to receive a data signal, and the electro-optical active layer converts the data signal into an optical signal to display an image.

The display device may include a touch sensing function, with which a user can interact, in addition to a function of displaying the image by the display panel. The touch sensing function is to determine touch information, such as whether an object touches the screen and the touch position thereof, by sensing a change in pressure, charge, light, and the like which are applied onto the screen in the display device, when the user touches the screen with a finger or a touch pen. The display device may also receive an image signal based on the touch information.

The touch sensing function may be implemented by a capacitive touch sensor including touch electrodes. In the capacitive touch sensor, touch electrodes form a capacitor and sense a change in the capacitance of the capacitor which is altered by a touch. The touch information may be generated based on the change in capacitance. However, due to the parasitic capacitance generated between the touch electrode and the electrode of the display panel, sensitivity of the sensor may deteriorate. Parasitic capacitance also becomes a problem as the distance between the touch electrode and the electrode in the display panel is decreased.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a touch sensor.

Additional aspects will be set forth in the detailed description which follows, and, in part, will be apparent from the disclosure, or may be learned by practice of the inventive concept.

According to exemplary embodiments, a display device includes a substrate and a touch electrode layer disposed on the substrate. The touch electrode layer includes a touch electrode having a mesh pattern. The density of the mesh pattern in a central portion of the touch electrode is different from the density of the mesh pattern at an outer portion of the touch electrode.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
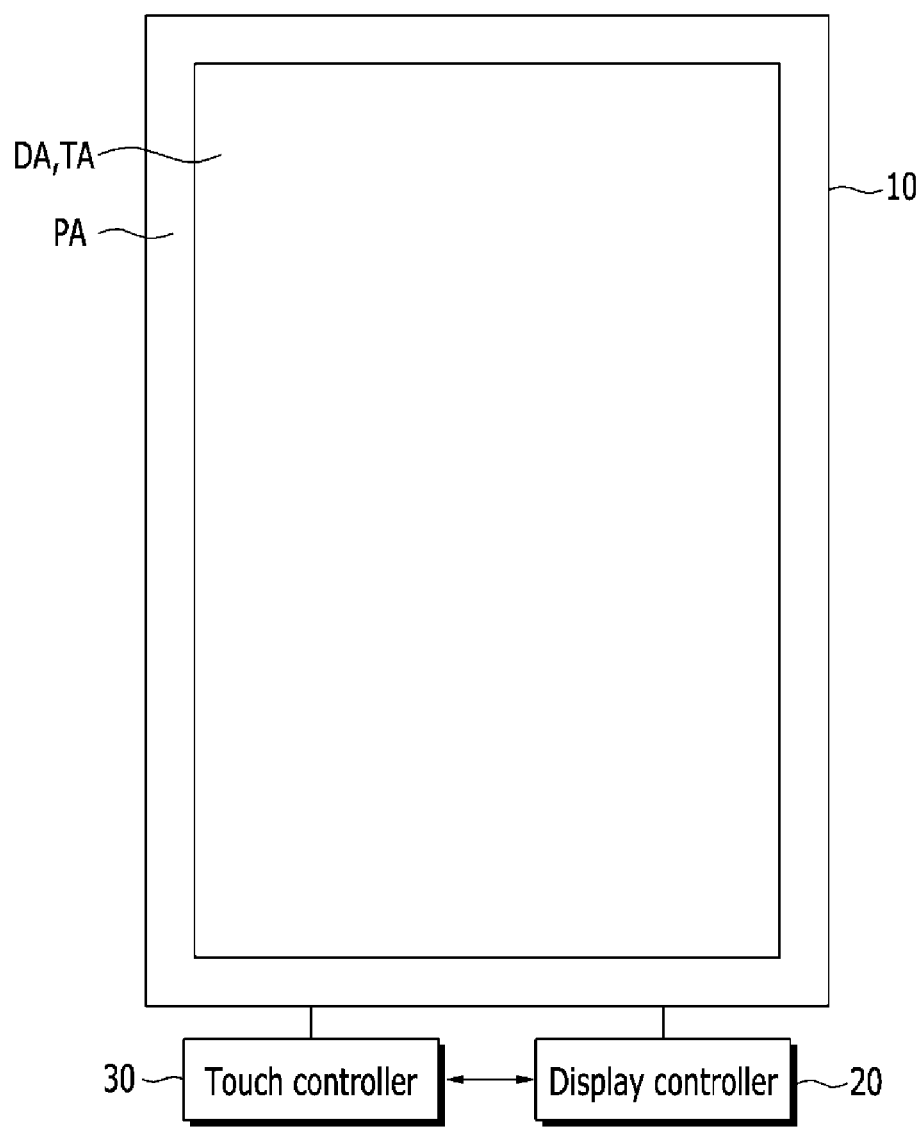
FIG. 1 is a layout view schematically illustrating a display device including a touch sensor according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device according to an exemplary embodiment of the present disclosure will be described in detail with reference to the accompanying drawings. Hereinafter, even though the present disclosure is mainly described in association with an organic light emitting diode display, the present disclosure may be applied to other display devices such as a liquid crystal display, an electrophoretic display, and a plasma display device.

A display device according to an exemplary embodiment will be described with reference to FIGS. 1 and 2. According to exemplary embodiments, since parasitic capacitance may be reduced without influencing the mutual capacitance between the touch electrodes, it is possible to improve sensitivity performance of the touch sensor.

Figure 2:
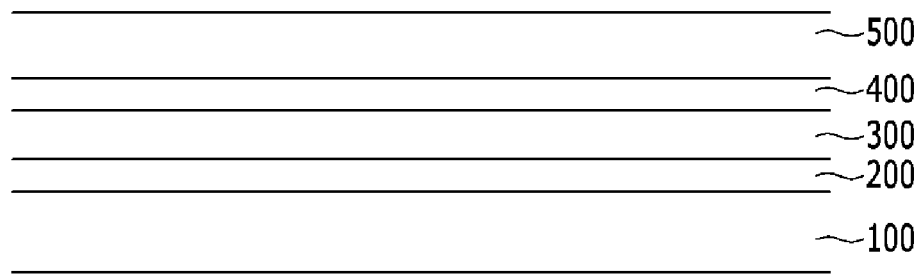
FIG. 2 is a cross-sectional view schematically illustrating a structure of the display device illustrated in FIG. 1.

FIG. 1 is a layout view schematically illustrating a display device including a touch sensor according to an exemplary embodiment, and FIG. 2 is a cross-sectional view schematically illustrating a structure of the display device illustrated in FIG. 1.

Referring to FIG. 1, a display device includes display panel 10, display controller 20 connected to display panel 10, and touch controller 30.

Display panel 10 includes a touch sensor receptive to the touch of an external object, such as a hand or a pen. The touch sensor may be formed on an outer surface of the display panel (on-cell type), or may also be formed in the display panel (in-cell type). Further, the touch sensor may be formed on a separate panel to be attached on display panels of an organic light emitting diode display, liquid crystal display, and the like (add-on type). Hereinafter, the display device according to the exemplary embodiment will be described in detail by exemplifying an on-cell type touch sensor in which the touch sensor is formed on the upper surface of the display panel of an organic light emitting diode display. However, the type of touch sensor or the kind of display device is not limited thereto.

Display panel 10 displays an image and senses a touch. Display panel 10 includes display area DA in which the image is actually displayed, touch area TA capable of sensing touch, and peripheral area PA around display area DA when viewed in a plan view.

When an object directly contacts display panel 10 (contact touch) or hovers while being close to or approaching display panel 10 (non-contact touch), touch area TA is an area which can sense the contact or hovering as a touch. Touch area TA may overlap with display area DA, and substantially coincide with display area DA.

Referring to FIG. 2, display panel 10 may include substrate 100, display active layer 200 formed on substrate 100, encapsulation layer 300 formed on display active layer 200, and touch active layer 400 formed on encapsulation layer 300. Anti-reflective layer 500, which may reduce reflection of external light, may be positioned on touch electrode layer 400. Anti-reflective layer 500 may be a polarization layer including a linear polarizer, a retarder, or the like. In order to protect the display panel, for example, a window (not illustrated) made of glass may be positioned on anti-reflective layer 500. Meanwhile, as the display panel, a liquid crystal panel may include a lower substrate, an upper substrate facing the lower substrate, and a liquid crystal layer positioned therebetween, and may include a touch electrode layer on the upper substrate. A liquid crystal panel may have no upper substrate, and liquid crystal may be injected into a microcavity. In this case, the touch electrode layer may be positioned on a layer such as the encapsulation layer which exists on the microcavity.

A pixel of the organic light emitting diode display and a structure thereof will be described in more detail with reference to FIGS. 3, 4, and 5.

Figure 3:
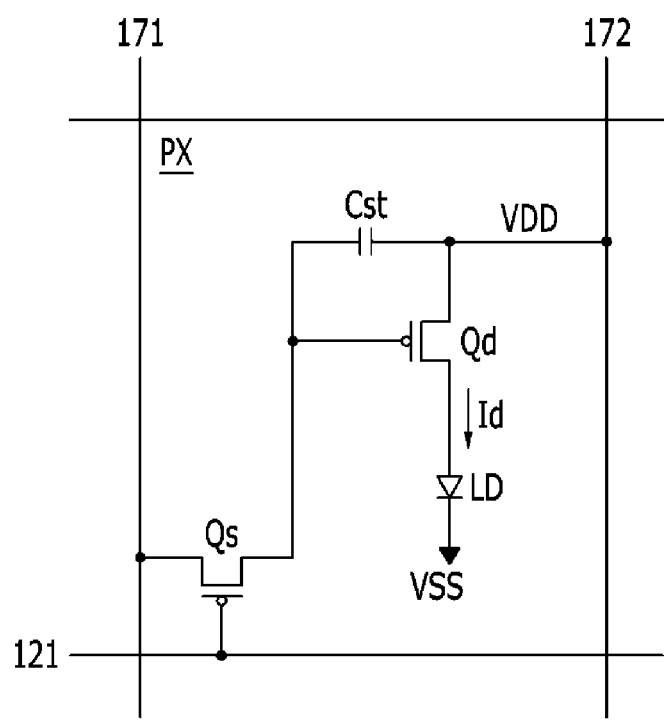
FIG. 3 is an equivalent circuit diagram of one pixel of an organic light emitting diode display according to an exemplary embodiment.

FIG. 3 is an equivalent circuit diagram of one pixel of an organic light emitting diode display according to an exemplary embodiment. FIG. 4 is a layout view illustrating one pixel of the organic light emitting diode display device according to an exemplary embodiment. FIG. 5 is a cross-sectional view of the pixel of FIG. 4 taken along line A-A.

Referring to FIG. 3, the organic light emitting diode display may include a plurality of display signal lines 121, 171, and 172, and a plurality of pixels which is connected to the display signal lines and arranged substantially in a matrix form.

The display signal line may include a plurality of gate lines 121 transferring gate signals, a plurality of data lines 171 transferring data signals, and a plurality of driving voltage lines 172 transferring driving voltages VDD. Gate lines 121 may extend substantially in a row direction and be substantially parallel to each other, and data lines 171 and driving voltage lines 172 may extend substantially in a column direction and be substantially parallel to each other. The gate signals and the data signals may be received by the display controller (see FIG. 1).

Each pixel may include switching thin film transistor Qs, driving thin film transistor Qd, storage capacitor Cst, and light emitting device LD.

Switching thin film transistor Qs has a control terminal, an input terminal, and an output terminal. The control terminal may be connected to gate line 121, the input terminal may be connected to data line 171, and the output terminal may be connected to driving thin film transistor Qd. Switching thin film transistor Qs transfers the data signal applied to data line 171 to driving thin film transistor Qd in response to the gate signal applied to gate line 121.

Driving thin film transistor Qd also has a control terminal, an input terminal, and an output terminal. The control terminal may be connected to switching thin film transistor Qs, the input terminal may be connected to driving voltage line 172, and the output terminal may be connected to light emitting device LD. Driving thin film transistor Qd runs output current Id of which the amplitude varies according to the voltage applied between the control terminal and the output terminal.

Storage capacitor Cst may be connected between the control terminal of driving thin film transistor Qd and the input terminal of driving thin film transistor Qd. Storage capacitor Cst charges the data signal applied to the control terminal of driving thin film transistor Qd and maintains the charged data signal even after switching thin film transistor Qs is turned off.

Light emitting device LD, which is an organic light emitting diode, has an anode connected to the output terminal of driving thin film transistor Qd, and a cathode electrode connected to common voltage VSS. Light emitting device LD emits light by varying the intensity according to the output current Id of driving thin film transistor Qd to display an image. Light emitting device LD may include an organic material which uniquely emits a wavelength range of light, such as light of one of the three primary colors of red, green, and blue, or include an organic material emitting white light, and the organic light emitting diode display may display a desired image by a spatial sum of the emitted wavelengths.

Switching thin film transistor Qs and driving thin film transistor Qd may be n-channel field effect transistors (FET) or p-channel field effect transistors. The configurations and connections of the switching and driving thin film transistors Qs and Qd, storage capacitor Cst, and light emitting device LD may be changed. For example, additional capacitors and transistors could be provided.

Figure 4:
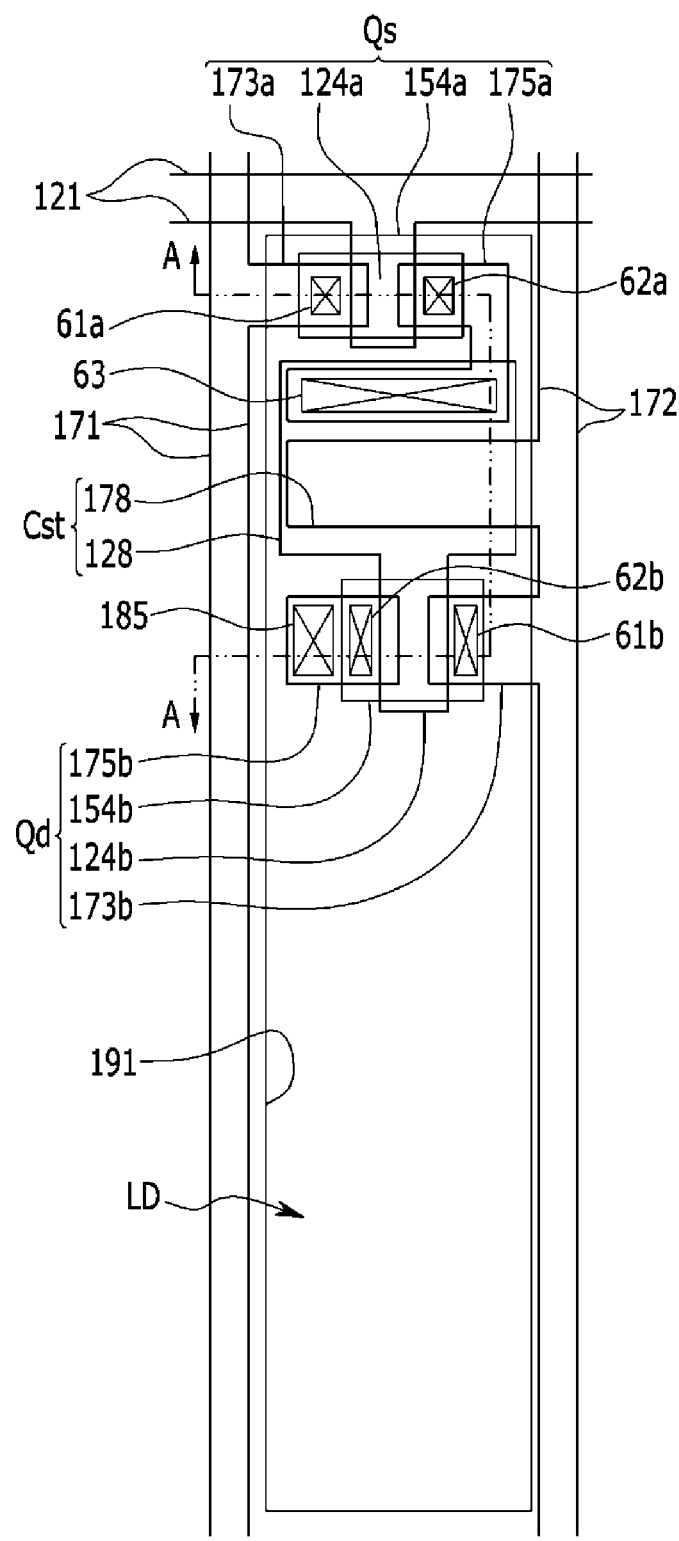
FIG. 4 is a layout view illustrating one pixel of the organic light emitting diode display device according to an exemplary embodiment.
Figure 5:
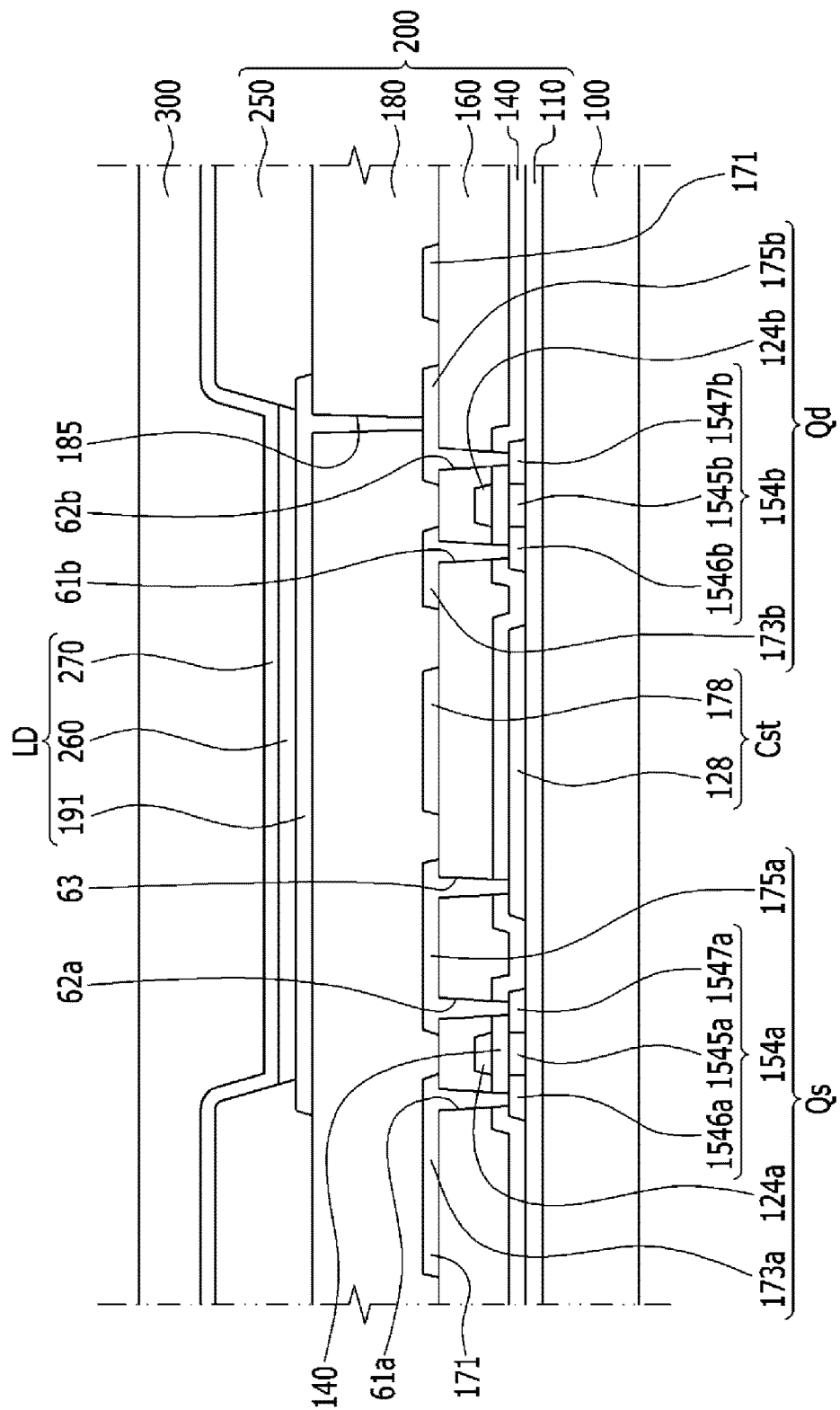
FIG. 5 is a cross-sectional view of the pixel of FIG. 4 taken along line A-A.

Referring to FIGS. 4 and 5, according to exemplary embodiments, the display panel of the organic light emitting diode display includes substrate 100, display active layer 200 positioned on substrate 100, and encapsulation layer 300 positioned on display active layer 200.

Substrate 100 may be a transparent insulation substrate made of transparent plastic, glass, or the like. In the case of a flexible display device, substrate 100 may be a flexible substrate formed by a transparent polymer film. In exemplary embodiments, substrate 100 may be made of a thermoplastic semicrystalline polymer such as polyethylene terephthalate (PET), polyethylene naphthalate (PEN), and polyethylene ether ketone (PEEK), a thermoplastic amorphous polymer such as polycarbonate (PC) and polyethylene sulfonate (PES), a plastic having relatively high heat resistance such as polyimide (PI) and polyarylate (PAR), and the like.

Display active layer 200 includes buffer layer 110, switching and driving semiconductor layers 154a and 154b, gate insulating layer 140, gate line 121, first capacitor plate 128, interlayer insulating layer 160, data line 171, driving voltage line 172, switching drain electrode 175a, driving drain electrode 175b, and passivation layer 180. Display active layer 200 further includes a light emitting device LD and a pixel defining layer 250.

Buffer layer 110 may be formed on substrate 100, and may include silicon nitride (SiNx), silicon oxide (SiOx), silicon oxynitride (SiOxNy), or the like, and may be formed as a single layer or a multilayer. Buffer layer 110 serves to prevent impurities which deteriorate a characteristic of the semiconductor, moisture, or external air from permeating the surface, and may planarize the surface. According to an exemplary embodiment, buffer layer 110 may be positioned in substrate 100. In exemplary embodiments, substrate 100 may have a structure in which polymer films (plastic layer) and the buffer layers are alternately laminated in a multi-layered form.

Switching semiconductor layer 154a and driving semiconductor layer 154b are disposed to be spaced apart from each other on buffer layer 110. Switching semiconductor layer 154a and driving semiconductor layer 154b may be made of polycrystalline silicon, and include channel regions 1545a and 1545b, source regions 1546a and 1546b, and drain regions 1547a and 1547b. Source regions 1546a and 1546b and drain regions 1547a and 1547b are disposed at both sides of channel regions 1545a and 1545b, respectively.

Channel regions 1545a and 1545b may be intrinsic semiconductors in which impurities are not doped, and source regions 1546a and 1546b and drain regions 1547a and 1547b are impurity semiconductors in which conductive impurities are doped.

Gate insulating layer 140 may be disposed on channel regions 1545a and 1545b of switching semiconductor layer 154a and driving semiconductor layer 154b. Gate insulating layer 140 may be a single layer or a multilayer including at least one of silicon nitride and silicon oxide.

Gate line 121 and first capacitor plate 128 may be disposed on gate insulating layer 140. Gate line 121 is elongated in a horizontal direction to transfer a gate signal, and includes switching gate electrode 124*a* protruding to switching semiconductor layer 154*a* from gate line 121. First capacitor plate 128 includes driving gate electrode 124*b* protruding from first capacitor plate 128 to driving semiconductor layer 154*b*. Switching gate electrode 124*a* and driving gate electrode 124*b* overlap with channel regions 1545*a* and 1545*b*, respectively.

First capacitor plate 128, buffer layer 110, and interlayer insulating layer 160 may be disposed as illustrated. In interlayer insulating layer 160, switching source contact hole 61*a* and switching drain contact hole 62*a*, which exposes the source region 1546*a* and the drain region 1547*a* of the switching semiconductor layer 154*a*, respectively, may be formed. Further, in interlayer insulating layer 160, driving source contact hole 61*b* and driving drain contact hole 62*b*, which exposes source region 1546*b* and drain region 1547*b* of driving semiconductor layer 154*b*, respectively, may be formed.

Data line 171, driving voltage line 172, switching drain electrode 175*a*, and driving drain electrode 175*b* may be disposed on interlayer insulating layer 160.

Data line 171 transfers a data signal and may extend in a direction crossing gate line 121, and may include switching source electrode 173*a* protruding toward switching semiconductor layer 154*a* from data line 171.

Driving voltage line 172 transfers a driving voltage, is separated from data line 171, and may extend in the same direction as data line 171. Driving voltage line 172 includes driving source electrode 173*b* protruding toward driving semiconductor layer 154*b* from driving voltage line 172, and second capacitor plate 178 protruding from driving voltage line 172 and overlapping with first capacitor plate 128. First capacitor plate 128 and second capacitor plate 178 form storage capacitor Cst by using the interlayer insulating layer 160 as a dielectric material.

Switching drain electrode 175*a* faces switching source electrode 173*a*, and driving drain electrode 175*b* faces driving source electrode 173*b*.

Switching source electrode 173*a* and switching drain electrode 175*a* may be connected to source region 1546*a* and drain region 1547*a* of switching semiconductor layer 154*a* through switching source contact hole 61*a* and switching drain contact hole 62*a*, respectively. Further, switching drain electrode 175*a* may be extended to be electrically connected with first capacitor plate 128 and driving gate electrode 124*b* through first contact hole 63 formed in interlayer insulating layer 160.

Driving source electrode 173*b* and driving drain electrode 175*b* may be connected to source region 1546*b* and drain region 1547*b* of driving semiconductor layer 154*b* through driving source contact hole 61*b* and driving drain contact hole 62*b*, respectively.

Switching semiconductor layer 154*a*, switching gate electrode 124*a*, switching source electrode 173*a*, and switching drain electrode 175*a* form switching thin film transistor Qs. Driving semiconductor layer 154*b*, driving gate electrode 124*b*, driving source electrode 173*b*, and driving drain electrode 175*b* form the driving thin film transistor Qd.

Passivation layer 180 is positioned on data line 171, driving voltage line 172, switching drain electrode 175*a*, and driving drain electrode 175*b*. In passivation layer 180, second contact hole 185 exposing driving drain electrode 175*b* may be formed.

Light emitting device LD and pixel defining layer 250 are disposed on passivation layer 180. Light emitting device LD includes pixel electrode 191, organic emission layer 260, and common electrode 270.

Pixel electrode 191 is disposed on passivation layer 180 and electrically connected with driving drain electrode 175*b* of the driving thin film transistor Qd through second contact hole 185 formed in the interlayer insulating layer 160. Pixel electrode 191 becomes an anode of light emitting device LD. Pixel electrode 191 may include a reflective metal such as lithium (Li), calcium (Ca), lithium fluoride/calcium (LiF/Ca), lithium fluoride/aluminum (LiF/Al), aluminum (Al), silver (Ag), magnesium (Mg), or gold (Au).

Pixel defining layer 250 is disposed on an edge of pixel electrode 191 and passivation layer 180. Pixel defining layer 250 has an opening exposing pixel electrode 191. In a plan view, a region where pixel defining layer 250 is formed corresponds to a non-pixel area, and the opening by which pixel electrode 191 is exposed may correspond to a pixel area. Pixel defining layer 250 may be formed by a resin such as polyacrylates or polyimides.

In the opening of pixel defining layer 250, organic emission layer 260 is disposed on pixel electrode 191. Organic emission layer 260 includes a light emitting layer, and may be configured by a plurality of layers including one or more of a hole injection layer (HIL), a hole transport layer (HTL), an electron transport layer (ETL), and an electron injection layer (EIL). When organic emission layer 260 includes the plurality of layers, the hole injection layer is positioned on pixel electrode 191, which is an anode. The hole transporting layer, light emitting layer, electron transporting layer, and electron injection layer may be sequentially laminated thereon.

Organic emission layer 260 may include a red organic emission layer, a green organic emission layer, and/or a blue organic emission layer which emit light of red, green, and blue, respectively, and the organic emission layers may be formed in a red pixel, a green pixel, and a blue pixel, respectively, to implement a color image. In organic emission layer 260, all of the red organic emission layer, the green organic emission layer, and the blue organic emission layer may be together laminated on the red pixel, the green pixel, and the blue pixel, and a red color filter, a green color filter, and a blue color filter may be formed for each pixel to implement the color image.

Common electrode 270 is positioned on pixel defining layer 250 and organic emission layer 260. Common electrode 270 may be formed by thinly laminating metal such as lithium, calcium, lithium fluoride/calcium, lithium fluoride/aluminum, aluminum, silver, magnesium, or gold to have light transmittance, or may be formed of a transparent conductive material such as ITO, IZO, ZnO, and $In_2O_3$. Common electrode 270 may become a cathode of light emitting device LD.

Encapsulation layer 300 is positioned on common electrode 270. Encapsulation layer 300 encapsulates light emitting device LD to prevent moisture and/or oxygen from permeating from the outside. Encapsulation layer 300 may be a glass substrate, and may be a thin film encapsulation layer (TFE) including a plurality of encapsulating thin films. In exemplary embodiments, encapsulation layer 300 may include at least one inorganic layer and at least one organic layer, and the inorganic layers and the organic layers may be alternately laminated.

The inorganic layer may be a single layer or a multilayer including metal oxide or metal nitride. In exemplary embodiments, the inorganic layer may include any one of silicon nitride (SiNx), aluminum oxide (AlOx), silicon oxide (SiOx), and titanium oxide (TiOx). In encapsulation layer 300, a top layer exposed outside may be formed by an inorganic layer in order to prevent moisture from permeating to the light emitting device LD.

In exemplary embodiments, the organic layer may be formed of a polymer, and may be a single layer or a multilayer formed of any one of polyethylene terephthalate (PET), polyimide (PI), polycarbonate (PC), epoxy, polyethylene (PE), and polyacrylate (PA).

Hereinafter, the touch electrode layer of the display device according to an exemplary embodiment will be described in detail with reference to FIGS. 6, 7, 8, 9, and 10.

Figure 6:
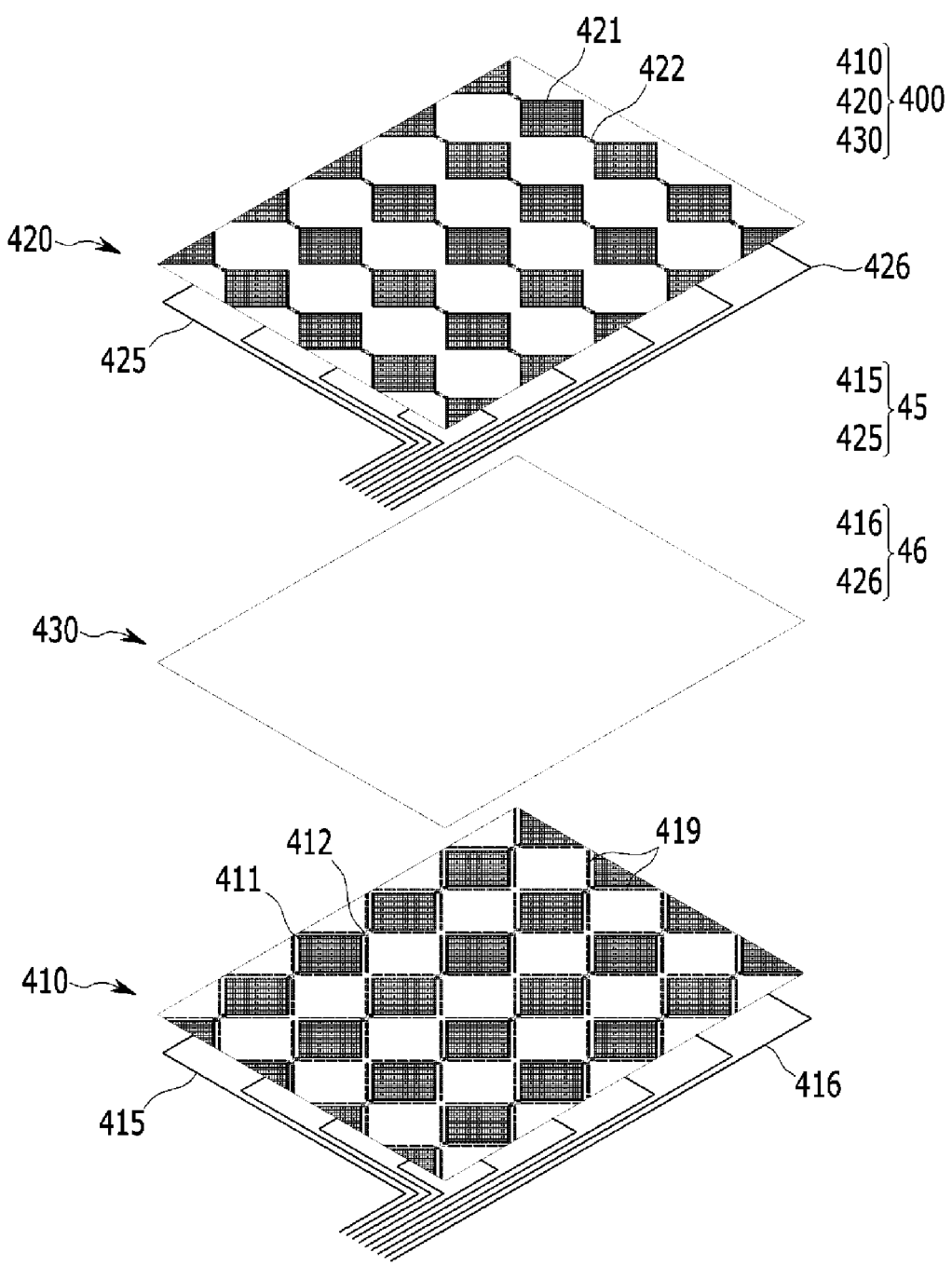
FIG. 6 is a diagram schematically illustrating a layer structure of a touch sensor layer according to an exemplary embodiment.
Figure 7:
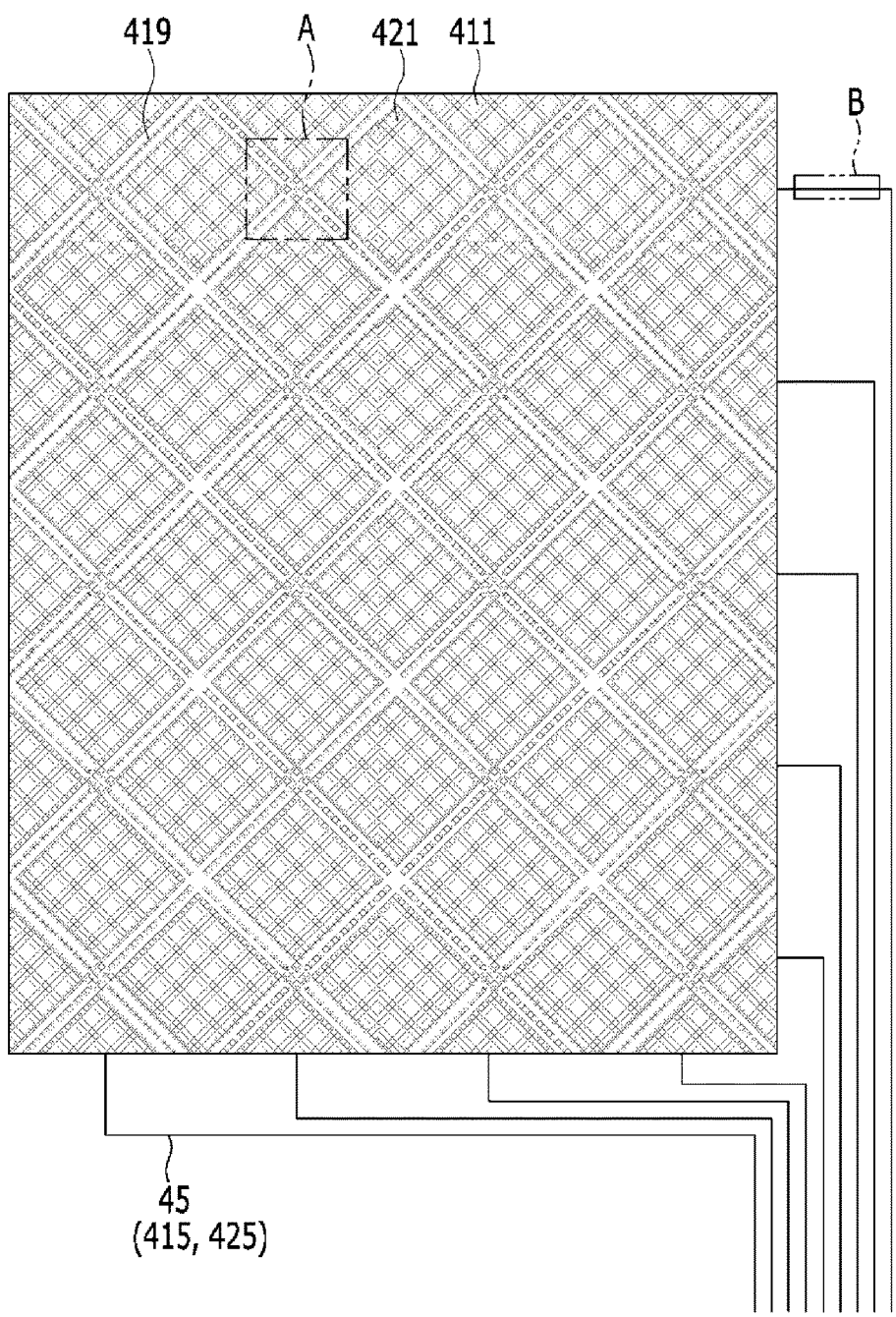
FIG. 7 is a plan view of a touch electrode layer of FIG. 6.
Figure 8:
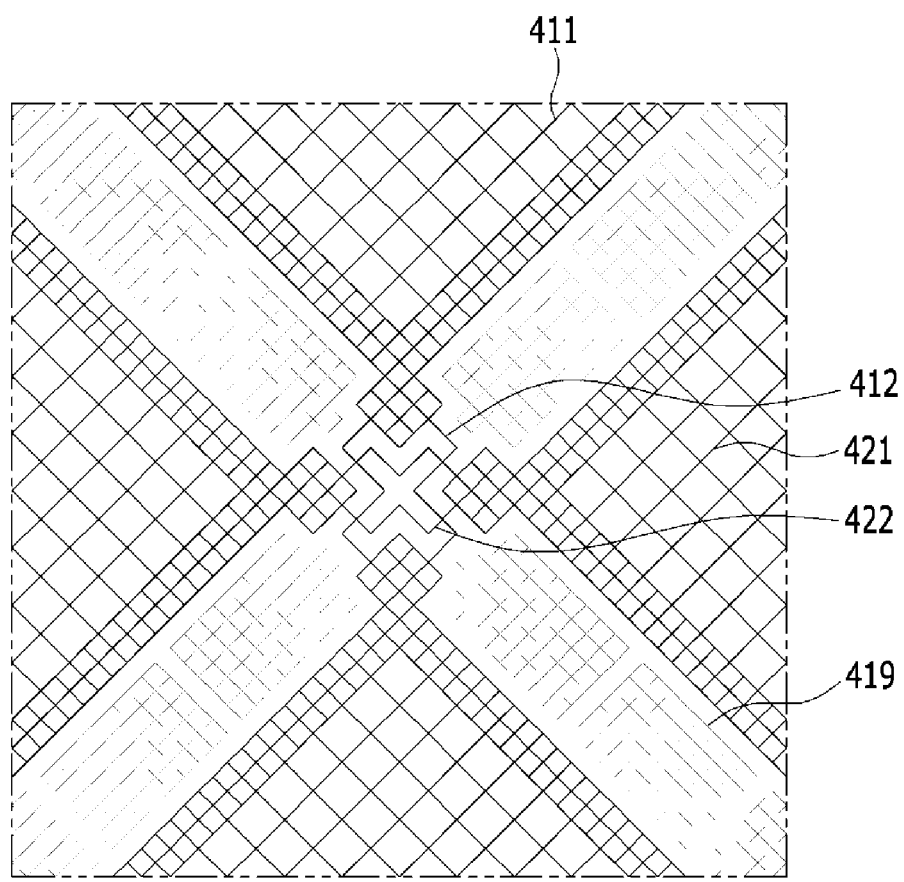
FIG. 8 is an enlarged view illustrating one example of region A in FIG. 7.
Figure 9:
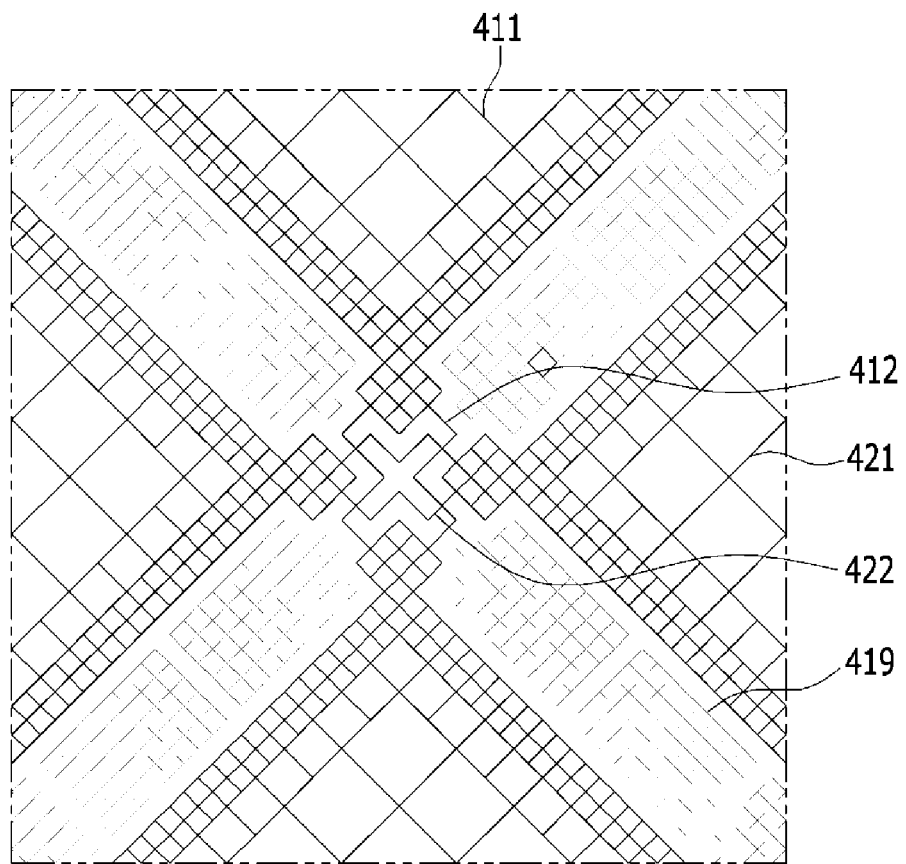
FIG. 9 is an enlarged view illustrating another example of region A in FIG. 7.
Figure 10:
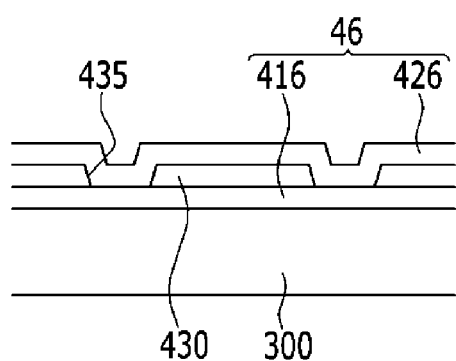
FIG. 10 is a cross-sectional view of region B in FIG. 7.

FIG. 6 is a diagram schematically illustrating a layer structure of a touch sensor layer according to an exemplary embodiment. FIG. 7 is a plan view of a touch electrode layer of FIG. 6. FIG. 8 is an enlarged view illustrating one example of region A in FIG. 7. FIG. 9 is an enlarged view illustrating another example of region A in FIG. 7. FIG. 10 is a cross-sectional view of region B in FIG. 7.

The touch sensor includes touch electrode layer 400 which may be formed on encapsulation layer 300 of display panel 10 described above. Touch electrode layer 400 includes first touch electrode layer 410 and second touch electrode layer 420, with insulating layer 430 formed therebetween. Meanwhile, although not illustrated, an insulating layer may be formed below first touch electrode layer 410 and/or on second touch electrode layer 420. The insulating layer may be made of silicon oxide (SiOx), silicon nitride (SiNx), silicon oxynitride (SiOxNy), etc.

First touch electrode layer 410 includes a plurality of first touch electrodes 411, a plurality of first connecting portions 412, a plurality of first lower touch signal lines 415, a plurality of second lower touch signal lines 416, and a plurality of dummy patterns 419. First touch electrodes 411, first connecting portions 412, first lower touch signal lines 415, second lower touch signal lines 416, and dummy patterns 419 may be simultaneously formed by forming and patterning one conductive material layer.

Second touch electrode layer 420 includes a plurality of second touch electrodes 421, a plurality of second connecting portions 422, a plurality of first upper touch signal lines 425, and a plurality of second upper touch signal lines 426. Second touch electrodes 421, second connecting portions 422, first upper touch signal lines 425, and second upper touch signal lines 426 may be simultaneously formed by forming and patterning one conductive material layer.

The plurality of first touch electrodes 411 are disposed in a column direction and a row direction, respectively, and the plurality of second touch electrodes 421 may be disposed in a column direction and a row direction, respectively. First touch electrodes 411 and second touch electrodes 421 are alternately distributed so as not to overlap with each other in a plan view.

Overall shapes of first and second touch electrodes 411 and 421 may be substantially quadrangular shapes, but are not limited thereto, and may be shapes such as circles, ovals, or hexagons, and may have various protrusions in order to improve the sensitivity. When the overall shapes of first and second touch electrodes 411 and 421 are substantially diamond shapes, first and second touch electrodes 411 and 421 positioned at the corner or edges of touch area TA may have substantially triangular shapes.

First touch electrodes 411 which are adjacent to each other in a column direction are connected to each other by first connecting portion 412, which is formed on first touch electrode layer 410, thus forming an electrode row. Second touch electrodes 421 which are adjacent to each other in a row direction are connected to each other by second connecting portion 422, which is formed on second touch electrode layer 420, thus forming an electrode column. Even though first connecting portion 412 and second connecting portion 422 cross each other, the electrode row and the electrode column are physically and electrically separated from each other by insulating layer 430. According to an exemplary embodiment, adjacent first touch electrodes 411 are connected to each other in the row direction, and adjacent second touch electrodes 421 may be connected to each other in the column direction.

First lower touch signal lines 415 are respectively connected to one end of each electrode row, and second upper touch signal lines 426 are respectively connected to one end of each electrode column. First lower touch signal lines 415 are connected with first upper touch signal lines 425 formed to overlap with first lower touch signal lines 415 to form respective first touch signal lines 45, and second upper touch signal lines 426 are connected with second lower touch signal lines 416 to form respective second touch signal lines 46. Connection of upper touch signal lines 425 and 426 to lower touch signal lines 415 and 416 may be, performed by contacting upper touch signal lines 425 and 426 and lower touch signal lines 415 and 416 through contact holes 435 in insulating layer 430 as illustrated in FIG. 10. According to an exemplary embodiment, the touch signal lines may be connected to both ends of a respective electrode column or electrode row.

First touch electrode 411 and second touch electrode 421, which are adjacent to each other, form a mutual sensing capacitor, functioning as the touch sensor. The mutual sensing capacitor may receive the sensing input signal through one of either first touch electrode 411 or second touch electrode 421, and output the change in the charge amount by the contact of the external object as a sensing output signal through the remaining touch electrode. One of the first and second touch signal lines 45 and 46 transmits one sensing input signal from touch controller 30 to first touch electrode 411 or second touch electrode 421, and the other touch signal line transmits the sensing output signal from second touch electrode 421 or first touch electrode 411 to touch controller 30.

Unlike those illustrated in the drawing, the plurality of first touch electrodes 411 are separated from each other and the plurality of second touch electrodes 421 are separated from each other to form an independent touch electrode and may be connected with the touch controller 30 through each touch signal line (not illustrated). In this case, each touch electrode may form a self-sensing capacitor as the touch sensor. The self-sensing capacitor receives the sensing input signal to be charged at a predetermined charge amount, and may output a sensing output signal different from the sensing input signal input by a change in charging amount caused when an external object such as a finger contacts the touch electrode.

First touch electrode 411 and second touch electrode 421 are formed by mesh patterns formed by crossing the metal lines. The mesh pattern may be formed by metals such as molybdenum (Mo), silver (Ag), titanium (Ti), copper (Cu), aluminum (Ti), titanium/aluminum/titanium (Ti/Al/Ti), molybdenum/aluminum/molybdenum (Mo/Al/Mo), or the like.

In a transparent electrode such as indium tin oxide (ITO) and indium zinc oxide (IZO), a defect such as a crack may occur when a flexible display device is implemented. In the case of the metal mesh, since the flexibility may be better than a transparent electrode, it is advantageous for use in a flexible display device. Further, since the electrode of the mesh pattern has a smaller area occupied by the electrode (metal line) than a transparent electrode having the same size, parasitic capacitance generated between the touch electrode and the electrode such as the cathode of the display panel may be reduced.

Since the metal is opaque, light emitted from the display panel may be blocked or refracted by the mesh pattern. Accordingly, the metal mesh does not overlap with the pixel area, rather the metal mesh overlaps with the non-pixel area so that image quality or luminance of the image displayed by the display panel does not deteriorate. The mesh pattern may be formed so that a width of the metal line is smaller than or equal to a width of the non-pixel area. An opening (a region in which the metal line is not formed) in the mesh pattern may overlap with one or more pixels.

As described above, first touch electrode 411 and second touch electrode 421 which are adjacent to each other may form a mutual sensing capacitor functioning as the touch sensor. Meanwhile, each of first touch electrode 411 and second touch electrode 421 forms a parasitic capacitor with a field generating electrode on the display panel, such as a common electrode which is a cathode. Since the capacitance is inversely proportional to the distance, the capacitance by the parasitic capacitor is increased as the distance between the touch electrode and the cathode is decreased. As the parasitic capacitance is increased, the base capacitance of the touch sensor is increased, and as a result, the sensitivity of the touch sensor is reduced. In the case where encapsulation layer 300 of display panel 10 is a thin film encapsulation layer, since the distance between first and second touch electrodes 411 and 421 and common electrode 270 is decreased, the deterioration of the sensitivity by the parasitic capacitance may further be a problem.

Since the capacitance is proportional to the area of the electrode, the area occupied by the metal line (that is, the density of the mesh pattern) is reduced even while the size of first and second touch electrodes 411 and 421 is maintained, thereby reducing parasitic capacitance. On the other hand, when the area of first and second touch electrodes 411 and 421 is decreased, the mutual capacitance between first and second touch electrodes 411 and 421 may be decreased. However, most mutual capacitance between first touch electrode 411 and second touch electrode 421 is generated adjacent a boundary between first touch electrode 411 and second touch electrode 421. Accordingly, when the area of an adjacent region (that is, an edge of the touch electrode) of each touch electrode is increased or maintained, even though the area of another region of each touch electrode is reduced, the mutual capacitance may be maintained.

In an exemplary embodiment, in order to reduce the parasitic capacitance while the mutual capacitance is maintained, first and second touch electrodes 411 and 421 are formed so that the density of the mesh pattern varies according to a region. That is, since first and second touch electrodes 411 and 421 are in a mesh pattern, as illustrated in FIG. 8, the area of outsides of first and second touch electrodes 411 and 421 may be relatively increased by relatively increasing the density of the outside of the mesh pattern. Further, the area of the center of first and second touch electrodes 411 and 421 may be reduced by decreasing the density of the center of the mesh pattern. As a result, the effect on the mutual capacitance between first and second touch electrodes 411 and 421 may be minimized, and since the area of first and second touch electrodes 411 and 421 is reduced, parasitic capacitance may be reduced. Meanwhile, as illustrated in FIG. 9, first and second touch electrodes 411 and 421 may be formed so that the density of the mesh pattern is gradually reduced toward the center from the outside.

In the case where the touch electrode forms the self-sensing capacitor as the touch sensor, the touch electrode may be formed so that the density of the center is relatively high and the density is reduced toward the outside. As a result, even while the deterioration of the self-capacitance of the touch electrode is minimized, the parasitic capacitance may be reduced, thereby increasing the sensitivity of the touch sensor.

In the case where a gap between first touch electrode 411 and second touch electrode 421 exists, dummy patterns 419 may be formed at the gap. Dummy patterns 419 may be formed so as to prevent the region where first and second touch electrodes 411 and 421 and the gap therebetween from being differently recognized. Dummy patterns 419 are in a floating state in which the dummy patterns 419 are not connected to any one of first touch electrode 411 and second touch electrode 421. The dummy patterns 419 are a mesh pattern like first and second touch electrodes 411 and 421, and does not overlap with the pixel area so as not to block the light emitted from the display pattern. According to an exemplary embodiment, the dummy patterns 419 may be omitted. Also, the dummy patterns may be formed on the second touch electrode layer 420.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A display device, comprising:
a substrate; and
a touch electrode layer disposed on the substrate,
wherein the touch electrode layer comprises:
  a touch electrode comprising a mesh pattern having a density in a central portion of the mesh pattern lower than a density of the mesh pattern in an outer portion of the mesh pattern,
  a dummy electrode formed in a dummy mesh pattern not overlapping the mesh pattern and the dummy mesh pattern spans a length corresponding to a plurality of regions of the touch electrode in a plan view.
2. The display device of claim 1, wherein:
the density of the mesh pattern is gradually reduced toward the central portion from the outer portion.
3. The display device of claim 1, wherein:
the mesh pattern is made of a metal material.
4. The display device of claim 1, wherein:
the touch electrode layer comprises a first electrode layer comprising first touch electrodes, a second electrode layer comprising second touch electrodes, and an insulating layer between the first electrode layer and the second electrode layer, and wherein the first and second touch electrodes respectively comprise the mesh pattern and the density of the mesh pattern of the first and second electrodes in a central portion of the respective touch electrode is different from the density of the mesh pattern at an outer portion of the respective touch electrode.

5. The display device of claim 4, wherein:
the first touch electrodes are selected from a group consisting of sensing input electrodes and sensing output electrodes and the second touch electrodes are selected from a group consisting of the sensing input electrodes and the sensing output electrodes not selected for the first touch electrodes.

6. The display device of claim 4, wherein:
the first touch electrodes are connected in a first direction by respective first connecting portions, the second touch electrodes are connected in a second direction by respective second connecting portions, and the first touch electrodes and the second touch electrodes do not overlap with one another in a plan view.

7. The display device of claim 6, wherein:
the first direction is a column direction, and the first touch electrodes are connected in the first direction to form electrode columns,
the second direction is a row direction which is substantially perpendicular to the first direction, and the second touch electrodes are connected in the second direction to form a electrode rows, and
touch signal lines are respectively connected to the electrode columns and electrode rows.

8. The display device of claim 7, wherein:
the touch signal lines are disposed on the first touch electrode layer and the second touch electrode layer, wherein the touch signal lines comprise a portion on the first touch electrode layer and a portion on the second touch electrode layer connected to each other through a contact hole formed in the insulating layer.

9. The display device of claim 4, wherein:
respective first touch electrodes are spaced apart from respective second touch electrodes in a plan view.

10. The display device of claim 9, wherein:
the dummy pattern is formed in the first touch electrode layer or the second touch electrode layer and is not connected with the first touch electrodes or the second touch electrodes.

11. The display device of claim 1, further comprising:
a display active layer positioned on the substrate; and
an encapsulation layer positioned on the display active layer,
wherein the touch electrode layer is positioned on the encapsulation layer.

12. The display device of claim 11, wherein:
the display active layer comprises pixel areas and a non-pixel areas, and
conducting portions of the mesh pattern are disposed in non-pixel areas in a plan view.

13. The display device of claim 11, wherein:
the display active layer comprises pixel areas and a non-pixel areas, and
openings in the mesh pattern correspond to pixel areas in a plan view.

14. The display device of claim 11, wherein:
the display active layer comprises a first electrode, a second electrode, and a light-emitting device disposed between the first and second electrodes.

15. The display device of claim 11, wherein:
the substrate is a flexible substrate, and the encapsulation layer is a thin film encapsulation layer.

16. The display device of claim 1, further comprising:
an opposing substrate facing the substrate; and
a liquid crystal layer positioned between the substrate and the opposing substrate,
wherein the touch electrode layer is positioned on the opposing substrate.

* * * * *